United States Patent
Cook et al.

(10) Patent No.: US 8,764,161 B2
(45) Date of Patent: Jul. 1, 2014

(54) PRINTING FLUIDS INCLUDING A HUMECTANT

(75) Inventors: Wayne Lee Cook, Xenia, OH (US); Jeremiah D. Allen, Fairborn, OH (US)

(73) Assignee: Eastman Kodak Company, Rochester, NY (US)

(*) Notice: Subject to any disclaimer, the term of this patent is extended or adjusted under 35 U.S.C. 154(b) by 432 days.

(21) Appl. No.: 13/222,679

(22) Filed: Aug. 31, 2011

(65) Prior Publication Data

US 2013/0050323 A1    Feb. 28, 2013

(51) Int. Cl.
| | |
|---|---|
| B41J 2/165 | (2006.01) |
| B41J 2/17 | (2006.01) |
| C09D 11/00 | (2014.01) |
| B41J 2/02 | (2006.01) |

(52) U.S. Cl.
CPC ............... *B41J 2/165* (2013.01); *C09D 11/54* (2013.01); *B41J 2/02* (2013.01)
USPC ............................................. 347/22; 347/95

(58) Field of Classification Search
CPC ...... C09D 11/54; C09D 11/322; C09D 11/40; C09D 11/30; B41J 2/165; B41J 2/02
USPC ............................ 347/95, 10, 14, 22; 510/710
See application file for complete search history.

(56) References Cited

U.S. PATENT DOCUMENTS

| | | |
|---|---|---|
| 4,614,948 A | 9/1986 | Katerberg et al. |
| 4,734,711 A | 3/1988 | Piatt et al. |
| 4,971,527 A | 11/1990 | Dick |
| 5,394,177 A | 2/1995 | McCann et al. |
| 5,917,512 A | 6/1999 | Weber et al. |
| 6,224,185 B1 | 5/2001 | Fassler et al. |
| 6,588,888 B2 | 7/2003 | Jeanmaire et al. |
| 6,746,994 B2 | 6/2004 | Harper |
| 6,811,243 B2 | 11/2004 | Pearlstine et al. |
| 6,943,037 B2 | 9/2005 | Anagnostopoulos et al. |
| 7,686,417 B2 | 3/2010 | Ota |
| 2003/0100458 A1* | 5/2003 | Harper .......................... 510/170 |
| 2005/0018023 A1* | 1/2005 | Momose et al. ................. 347/95 |
| 2010/0040782 A1 | 2/2010 | Arai et al. |
| 2010/0203247 A1 | 8/2010 | Kariya et al. |
| 2010/0236447 A1 | 9/2010 | Sakai |
| 2011/0069114 A1 | 3/2011 | Ikoshi et al. |
| 2011/0122180 A1* | 5/2011 | Cook et al. ....................... 347/10 |

FOREIGN PATENT DOCUMENTS

| | | |
|---|---|---|
| EP | 1 013 450 | 7/2006 |
| WO | 2007/022162 | 2/2007 |

* cited by examiner

*Primary Examiner* — Alessandro Amari
*Assistant Examiner* — Carlos A Martinez
(74) *Attorney, Agent, or Firm* — Andrew J. Anderson; Raymond L. Owens (57) ABSTRACT

A method of continuous inkjet printing by using a printing fluid comprising water, a soluble or dispersed polymeric component, and less than a total of 10 wt % of low-volatile water soluble humectant having a boiling point of greater than 170C; ejecting spaced droplets from a printhead and controlling the spaced droplets to mark a substrate; stopping delivery of the printing fluid to the printhead; and then delivering the maintenance fluid from the maintenance fluid supply to the printhead to purge the printing fluid from the printhead, with the maintenance fluid comprising water and at least 5 wt % low-volatile water soluble humectant having a boiling point of greater than 170C, wherein the concentration of low-volatile water soluble humectant in the maintenance fluid is greater than that in the printing fluid to purge the printing fluid from the printhead.

15 Claims, 1 Drawing Sheet

PRINTING FLUIDS INCLUDING A HUMECTANT

FIELD OF THE INVENTION

The invention relates generally to the field of printing systems and methods, and in particular to printing systems employing recirculating printing fluids such as continuous inkjet printing systems. More specifically, the invention relates to use of pigmented printing fluids and compatible maintenance fluids in continuous inkjet printing systems.

BACKGROUND OF THE INVENTION

Inkjet printing is a non-impact method for producing printed images by the deposition of ink droplets in a pixel-by-pixel manner to an image-recording element in response to digital signals. There are various methods that can be used to control the deposition of ink droplets on the image-recording element to yield the desired printed image. In one process, known as drop-on-demand inkjet, individual droplets are projected as needed onto the image-recording element to form the desired printed image. Common methods of controlling the ejection of ink droplets in drop-on-demand printing include thermal bubble formation (thermal inkjet (TIJ) and piezoelectric transducers. In another process known as continuous inkjet (CIJ), a continuous stream of droplets is generated and expelled in an image-wise manner onto the surface of the image-recording element, while non-imaged droplets are deflected, caught, and recycled to an ink sump. Inkjet printers have found broad applications across markets ranging from desktop document and photographic-quality imaging, to commercial printing and industrial labeling.

Ink compositions containing colorants used in inkjet printers can be classified as either pigment-based, in which the colorant exists as pigment particles suspended in the ink composition, or as dye-based, in which the colorant exists as a fully solvated dye species that includes one or more dye molecules. Pigments are highly desirable since they are far more resistant to fading than dyes. However, pigment-based inks have a number of drawbacks. Great lengths are undertaken to reduce a pigment particle to a sufficiently small particle size and to provide sufficient colloidal stability to the particles. Pigment-based inks often require a lengthy milling operation to produce particles in the sub-micron range needed for most modern ink applications. If the pigment particles are too large light scattering can have a detrimental effect on optical density and gloss in the printed image.

A second drawback of pigmented inks is their durability after printing, especially under conditions where abrasive forces have been applied to the printed image. Pigment-based inks typically reside at the surface of the imaging receiver to which they are printed and this makes the printed images particularly susceptible to abrasive forces. To this extent, pigmented inks have been formulated with various polymers, dispersants, and other addenda to provide durable images that can withstand post printing physical abuse and environmental conditions.

The degree of abrasion resistance of a printed image is also a function of time after printing. At short time intervals after printing, typically from a few minutes to a few hours, the ink undergoes several complex dynamic changes. As the ink contacts the receiver, some of the components penetrate into the receiver and the droplets can simultaneously spread laterally on the receiver surface. Carrier fluids such as water and humectants are drawn into the receiver by capillary forces and the polymer binders begin to film form. At short time intervals the binder film formation is incomplete and the resulting pigment cake is particularly susceptible to abrasive forces. Typically, the more total fluid that is printed to the receiver (and hence more water) the longer it takes for the ink to dry and form a durable image. The abrasion resistance of the image is further affected by the presence of humectants, which are employed for optimal firing performance, but which are retained in the pigment cake for some period of time. Since most humectants have much lower vapor pressures than water, they are relatively slow to evaporate and can be retained in the image receiver for several hours. Humectants can have the effect of plasticizing the polymer binder and making the surface of the image tacky or softer than if no humectant was present. Once the humectants evaporate, the resulting pigment cake, consisting primarily of pigment and binders, reaches a steady state composition, and determines the long-term abrasion resistance of the printed image.

Continuous inkjet (CIJ) printers typically consist of two main components, a fluid system and one or more printheads. Ink is delivered through a supply line from a supply reservoir to a manifold that distributes the ink to a plurality of orifices, typically arranged in linear array(s), under sufficient pressure to cause ink streams to issue from the orifices of the printhead. Stimulations are applied to the printhead to cause those ink streams to form streams of spaced droplets, which are deflected into printing or non-printing paths. The non-printing droplets are returned to the supply reservoir via a droplet catcher and a return line. U.S. Pat. Nos. 4,734,711 and 5,394,177 and EP 1,013,450 describe in detail the design of a fluid system for CIJ apparatus. The more recent development of CIJ printing apparatus and printhead fabrication can be found in U.S. Pat. Nos. 6,588,888 and 6,943,037.

Ink drop uniformity requires maintaining a uniform pressure in the printhead cavity. U.S. Pat. No. 4,614,948 describes that a positive displacement pump, such as gear pump, is preferred for use as the ink supply pump. The need to limit pulsation produced by the pump is recognized in U.S. Pat. No. 4,971,527. In addition, filters are employed at appropriate locations in fluid system to remove oversized particles prior to ink entering into printhead orifices and avoid printhead clogging.

CIJ inks traditionally have been mostly aqueous dye-based inks, where issues regarding robust system runability, such as easy start up/shut down, extended printing time without crooked jet, and reduced frequency for filter changing have been minimized. In such traditional dye-based inks, no particles are observable under the microscope. Although there have been many recent advances in the art of dye-based inkjet inks, such inks still suffer from deficiencies such as low optical densities on coated glossy paper and poor light-fastness. When water is used as the carrier, such inks also generally suffer from poor water fastness and poor smear resistance. Accordingly, the advantages associated with the use of pigmented inks would also be desirable for use in continuous inkjet printing systems.

Inkjet printers further require straight, uniform droplet streams or jets for quality printing. Current ink jet printing systems include a fluid system supporting one or more printheads. Typical ink jet printheads operate by forcing fluid through a droplet generator that contains an array of orifices, forming droplets of ink. The printhead is fully supported by the fluid system. The fluid system controls different valves and pumps to perform necessary functions for the printhead to operate reliably. These functions include cleaning, startup, and shutdown. One particular function, shutdown, provides a means to stop the operation of the printhead and fluid system over an extended period of time, and allows for a restart of the operation. If ink is left in the droplet generator during a shutdown, however, the fluids can dry in and around the orifices leaving behind non-volatile components in the form of solids or gels. Upon subsequent startups, the failure to remove or re-dissolve all of this material in and around the orifices creates disturbances in the shape or direction of the emerging jets. Dried ink solidified on the jetting nozzle or orifice can thus cause jets to deflect thereby causing print defects. Dried ink is particularly a problem with inks containing polymeric components, and in particular for dried pigmented inks containing polymeric components. This problem is typically corrected by adding humectants to the inks, and by performing maintenance procedures which include purging ink channels and nozzles with a maintenance or cleaning fluid during shutdowns and/or a physical wiping or parking process for the printhead nozzles.

In continuous inkjet printing, however, it is not practical to add large amounts of humectants to the inks as is typically practiced in drop-on-demand printing. Humectants such as glycerin or other polyhydroxylated organic compounds typically do not exceed 10 weight percent of a continuous inkjet printing ink composition. At higher humectants concentrations, the ink viscosity will become too high for proper drop formation and jetting, and drying times will become too slow for the desired high printing speeds of continuous inkjet printing. Preferably, the humectant concentration is less than or equal to about 6% by weight of the ink formulation for continuous inkjet printing inks.

In continuous inkjet printing, it is further undesirable and sometimes impossible to physically contact the printhead to clean the nozzles. Wiping or parking the printhead for cleaning purposes is thus not practical. In order to enable quality printing, removal of dried ink and foreign matter from the nozzles thus typically must be achieved by chemical cleaning alone. Furthermore, the maintenance or cleaning fluids used for chemical cleaning of the nozzles must be compatible with the imaging inks used as they will become part of the ink to some level. Ideally this level should be low, but it is seldom zero. Chemical cleaning processes further will typically not remove all of the ink residues. Therefore the maintenance fluid must be compatible with small amounts of residual ink (e.g., 2-10 weight %) over periods of several hours to several weeks, and then be capable of being quickly and completely removed by the ink when the printing process is restarted.

Ota, in U.S. Pat. No. 7,686,417, discloses maintenance fluids for a drop-on demand inkjet printer employing pigment-based inks. The fluids comprise a resin solvent such as an alcohol, an ether (for example, diethylene glycol monobutyl ether), a ketone or an ester, among others; a humectant such as glycerin, diethylene glycol, propylene glycol or triethylene glycol, among others; as well as surfactants, biocides and other additives.

SUMMARY OF THE INVENTION

It would be desirable to provide a continuous inkjet printing process employing printing and maintenance fluids which are effective at maintaining clear printhead nozzles and effective continuous inkjet image printing and drying performance.

In accordance with one embodiment, the invention provides a method of continuous inkjet printing comprising:

A) providing a main fluid supply of a continuous inkjet printer with a printing fluid comprising water, a soluble or dispersed polymeric component, and less than a total of 10 wt % of low-volatile water soluble humectant having a boiling point of greater than 170C;

B) delivering the printing fluid from the main fluid supply to a printhead and ejecting a continuous stream of the printing fluid from the printhead which continuous stream is broken into spaced droplets;

C) in response to electrical signals received from a control mechanism, controlling the spaced droplets to select between printing droplets for marking a substrate and nonprinting droplets that are collected and returned to the main fluid supply;

D) stopping delivery of the printing fluid to the printhead upon completion of a printing procedure;

E) providing a maintenance fluid supply with a maintenance fluid comprising water and at least 5 wt % low-volatile water soluble humectant having a boiling point of greater than 170C, wherein the concentration of low-volatile water soluble humectant in the maintenance fluid is greater than that in the printing fluid; and F) delivering the maintenance fluid from the maintenance fluid supply to the printhead after use of the printing fluid in the printhead and ejecting the maintenance fluid from the printhead to purge the printing fluid from the printhead.

In further embodiments, the maintenance fluid is stored in the printhead for a period of time, and delivery of the printing fluid from the main fluid supply to the printhead is subsequently restarted to start a new printing procedure.

The invention further provides a fluid set for an inkjet printer, comprising: at least one printing fluid comprising water, a colorant, a water soluble or dispersed polymeric component, and less than 10 wt % of low-volatile water soluble humectant having a boiling point of greater than 170C; and at least one maintenance fluid comprising water and at least 5 wt % low-volatile water soluble humectant having a boiling point of greater than 170C, wherein the ratio of wt % of low-volatile humectant in the maintenance fluid to wt % low-volatile humectant in the printing fluid is at least 3:2.

BRIEF DESCRIPTION OF THE DRAWINGS

In the detailed description of the example embodiments of the invention presented below, reference is made to the accompanying drawing, in which.

DETAILED DESCRIPTION OF THE INVENTION

In a particular embodiment, the invention is directed towards a continuous inkjet printer. In such CIJ printers, a continuous stream of droplets is generated, a portion of which are deflected in an image-wise manner onto the surface of the image-recording element, while un-imaged droplets are caught and returned to an ink sump. In the system of continuous inkjet printing a main fluid supply is provided with the printing fluid composition, which is then delivered from the main fluid supply to a printhead, where a continuous stream of the ink composition is ejected from the printhead, which continuous stream then is broken into spaced droplets. In response to electrical signals received from a control mechanism, the droplets are then selected between printing droplets for marking a substrate and nonprinting droplets that are collected and returned to the main fluid supply. Continuous inkjet systems which may be used in accordance with specific embodiments of the present invention include those disclosed, e.g., in U.S. Pat. Nos. 6,588,888, 6,554,410, 6,682,182, and 6,575,566 to Jeanmaire et al.; US Publication No.

2003/0202054 to Jeanmaire et al.; U.S. Pat. Nos. 6,793,328 and 6,866,370 to D. Jeanmaire; and U.S. Pat. No. 6,517,197 to Hawkins et al.; the disclosures of which are herein incorporated in their entirety by reference. In another embodiment, an apparatus capable of controlling the direction of the formed printing and non-printing drops by asymmetric application of heat to the fluid stream that initializes drop break-up and serves to steer the resultant drop may be employed, as disclosed in U.S. Pat. Nos. 6,079,821 and 6,505,921 to Chwalek et al., the disclosures of which are herein incorporated in their entirety by reference. Useful ink agitation, heated ink supply and printhead and fluid filtration means for CIJ pigmented inkjet ink compositions are described in U.S. Pat. No. 6,817,705 to Crockett et al., the disclosure of which is herein incorporated in its entirety by reference. Printer replenishing systems for maintaining ink quality and countering the effects of ink volatile component evaporation are described in U.S. Pat. No. 5,526,026 to M. Bowers and U.S. Pat. No. 5,473,350 to Mader et al., and EP 0 597 628 A1 to Loyd et al., the disclosures of which are herein incorporated in their entirety by reference.

Figure 1:
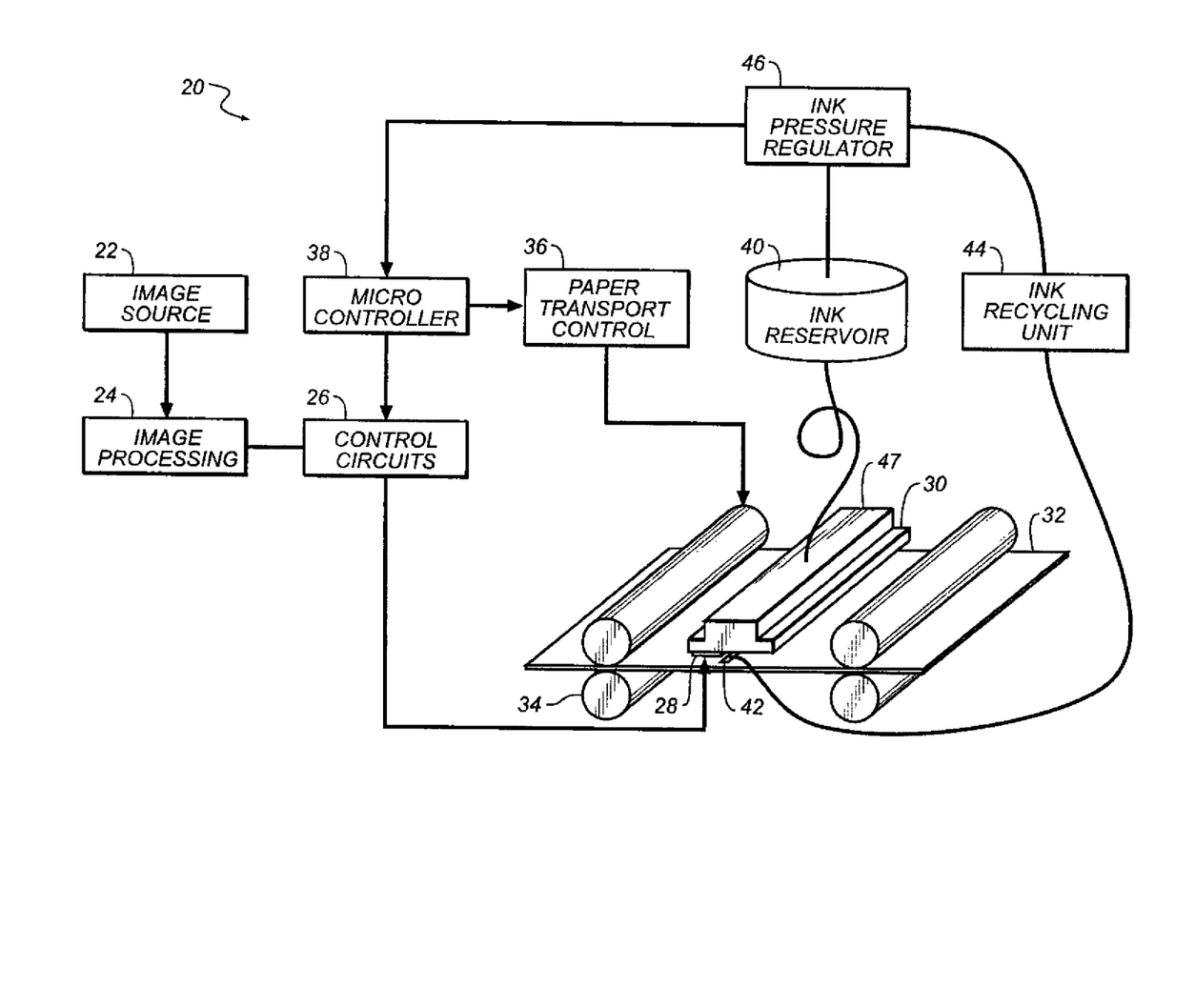
FIG. 1 shows a schematic diagram of a continuous inkjet printing system employed in accordance with an embodiment of the present invention.

Referring to FIG. 1, a continuous printing system 20 includes an image source 22 such as a scanner or computer which provides raster image data, outline image data in the form of a page description language, or other forms of digital image data. This image data is converted to half-toned bitmap image data by an image processing unit 24 which also stores the image data in memory. A plurality of drop forming mechanism control circuits 26 read data from the image memory and apply time-varying electrical pulses to a drop forming mechanism(s) 28 that are associated with one or more nozzles of a printhead 30. These pulses are applied at an appropriate time, and to the appropriate nozzle, so that drops formed from a continuous inkjet stream will form spots on a recording medium 32 in the appropriate position designated by the data in the image memory. Recording medium 32 is moved relative to printhead 30 by a recording medium transport system 34, which is electronically controlled by a recording medium transport control system 36, and which in turn is controlled by a micro-controller 38. The recording medium transport system shown in FIG. 1 is a schematic only, and many different mechanical configurations are possible. For example, a transfer roller could be used as recording medium transport system 34 to facilitate transfer of the ink drops to recording medium 32. Such transfer roller technology is well known in the art. In the case of page width printheads, it is most convenient to move recording medium 32 past a stationary printhead. However, in the case of scanning print systems, it is usually most convenient to move the printhead along one axis (the sub-scanning direction) and the recording medium along an orthogonal axis (the main scanning direction) in a relative raster motion.

Ink is contained in an ink reservoir 40 under pressure. In the non-printing state, continuous inkjet drop streams are unable to reach recording medium 32 due to an ink catcher 42 that blocks the stream and which may allow a portion of the ink to be recycled by an ink recycling unit 44. The ink recycling unit reconditions the ink and delivers it back to reservoir 40. Such ink recycling units are well known in the art. The ink pressure suitable for optimal operation will depend on a number of factors, including geometry and thermal properties of the nozzles and thermal properties of the ink. A constant ink pressure can be achieved by applying pressure to ink reservoir 40 under the control of ink pressure regulator 46. Alternatively, the ink reservoir can be left unpressurized, or even under a reduced pressure (vacuum), and a pump is employed to deliver ink from the ink reservoir under pressure to the printhead 30. In such an embodiment, the ink pressure regulator 46 can comprise an ink pump control system. As shown in FIG. 1, catcher 42 is a type of catcher commonly referred to as a "knife edge" catcher. The ink is distributed to printhead 30 through an ink channel 47. The ink preferably flows through slots or holes etched through a silicon substrate of printhead 30 to its front surface, where a plurality of nozzles and drop forming mechanisms, for example, heaters, are situated. When printhead 30 is fabricated from silicon, drop forming mechanism control circuits 26 can be integrated with the printhead. Printhead 30 also includes an ink drop deflection mechanism (not shown), such as described in the above referenced patents.

The printing fluids employed in the present invention are aqueous-based printing fluids. "Aqueous-based" is defined herein to mean the printing fluid comprises mainly water as the carrier medium for the remaining printing fluid components. In a preferred embodiment, the printing fluids employed in the present invention comprise at least about 50 weight percent water. In a specific embodiment, the printing fluid is a pigment-based ink. Pigment-based inks are defined as inks containing at least a dispersion of water-insoluble pigment particles.

A fluid set is defined as a set of two or more fluids. An ink set is defined as a set of two or more inks. An ink set may contain pigment-based inks of different colors, for example, cyan, magenta, yellow, red, green, blue, orange, violet, or black. In one embodiment, a carbon black pigmented ink is used in an ink set comprising at least three inks having separately, a cyan, a magenta, and a yellow colorant. Useful ink sets also include, in addition to the cyan, magenta, and yellow inks, complimentary colorants such as red, blue, violet, orange, or green inks. In addition, the ink set may comprise light and dark colored inks, for example, light cyan and light magenta inks commonly used in the ink sets of wide format printers. It is possible to include one or more inks that comprise a mixture of different colored pigments in the ink set. An example of this is a carbon black pigment mixed with one or more colored pigments or a combination of different colored pigments. An ink set may also include one or more pigment-based inks in combination with one or more clear inks. An ink set may also include at least one or more pigment-based inks in combination with additional inks that are dye-based ink. An ink set may further comprise one or more inks containing a self-dispersing carbon black pigment ink which is used primarily for printing of text and a plurality of cyan, magenta, yellow, and black inks which are used primarily for photographic quality printing.

Printing fluid compositions employed in the present invention comprise at least one water soluble or water-dispersed polymeric component. Such polymeric component may be, e.g., a polymeric dispersant employed to disperse pigment colorants, or a polymeric additive included to improve durability or other characteristics of the printing fluid compositions, such as recirculation stability.

Pigment-based ink compositions employing non-self-dispersed pigments that are useful in pigmented printing fluids employed in the invention may be prepared by any method known in the art of inkjet printing. Useful methods commonly involve two steps: (a) a dispersing or milling step to break up the pigments to desirable particle size, and (b) a dilution step in which the pigment dispersion from step (a) is diluted with the remaining printing fluid components to give a working strength ink. The milling step (a) is carried out using any type of grinding mill such as a media mill, a ball mill, a two-roll mill, a three-roll mill, a bead mill, an air-jet mill, an attritor, or a liquid interaction chamber. In the milling step (a), pigments are optionally suspended in a medium that is typically the same as or similar to the medium used to dilute the pigment dispersion in step (b). Inert milling media are optionally present in the milling step (a) in order to facilitate break up of the pigments to desired particle size. Inert milling media include such materials as polymeric beads, glasses, ceramics, metals and plastics as described, for example, in U.S. Pat. No. 5,891,231. Milling media are removed from either the pigment dispersion obtained in step (a) or from the ink composition obtained in step (b).

A dispersant is present in the milling step (a) in order to facilitate break up of the pigments. For the pigment dispersion obtained in step (a) or the ink composition obtained in step (b), a dispersant is present in order to maintain particle stability and prevent settling. The dispersant for the pigment particles can be a surfactant, such as for example, potassium oleylmethyl taurate (KOMT), sodium dodecyl sulfate or sodium dioctyl sulfosuccinate.

In a particular embodiment of the invention, a printing fluid which employs a colorant which comprises pigment particles dispersed with a polymeric dispersant is used, and the water soluble or water dispersed polymeric component of the printing fluid comprises the polymeric dispersant.

Polymeric dispersants can be used to disperse the pigment particles prior to, or during the milling step. Typically, these polymeric dispersants are copolymers made from hydrophobic and hydrophilic monomers. Examples of polymeric dispersants for pigment particles include random and block copolymers having hydrophilic and hydrophobic portions; see for example, U.S. Pat. Nos. 4,597,794, 5,085,698, 5,519,085, 5,272,201, 5,172,133, and 6,043,297, and PCT Patent Publication Number WO 2004/111140A1; and graft copolymers; see for example, U.S. Pat. Nos. 5,231,131, 6,087,416, 5,719,204, and 5,714,538. Among these polymeric dispersants anionic polymeric dispersants are especially useful.

Polymeric dispersants useful for dispersing the pigment particles employed in the present invention are not limited in the arrangement of the monomers comprising the dispersant. The arrangement of monomers may be totally random, or they may be arranged in blocks such as AB or ABA wherein, A is the hydrophobic monomer and B is the hydrophilic monomer. In addition, the polymer may take the form of a random terpolymer or an ABC tri-block wherein, at least one of the A, B and C blocks is chosen to be the hydrophilic monomer and the remaining blocks are hydrophobic blocks dissimilar from one another.

Polymeric dispersants useful for dispersing the pigment particles can be selected from acrylics and styrene-acrylics. Styrene-acrylic polymeric dispersants especially useful in the present invention are copolymers of styrenic monomers and carboxylate monomers. Examples of such dispersants include copolymers of styrene or alphamethyl styrene and acrylic acid or methacrylic acid (such as the JONCRYL BASF or TRUDOT Mead Westvaco polymers) or styrene maleic anhydride and styrene maleic anhydride amic acid copolymers (such as SMA-1440, SMA-17352, SMA-1000, SMA-2000 Sartomer Inc.).

Acrylic polymeric dispersants useful in the present invention are typically formed from one or more acrylic monomer and one or more ionizable monomer, such as, for example carboxyalted or sulfonated monomers. Acrylic polymeric dispersants are typically formed from one or more hydrophobic acrylate monomer including, for example, methylmethacrylate, ethylmethacrylate, butylmethacrylate, hexylmethacryate, octylmethacrylate and decylmethacrylate.

Other especially useful polymeric dispersants are those where the hydrophobic monomer is selected from benzyl methacrylate or acrylate, or from acrylic acid esters containing an aliphatic chain having twelve or more carbons and where the hydrophilic monomer is a carboxylated monomer. Examples of acrylic acid esters having twelve or more carbons include; lauryl acrylate, lauryl methacrylate, tridecyl acrylate, tridecyl methacrylate, tetradecyl acrylate, tetradecyl methacrylate, cetyl acrylate, iso-cetyl acrylate, stearyl methacrylate, iso-stearyl methacrylate, stearyl acrylate, stearyl methacrylate, decyltetradecyl acrylate, and decyltetradecyl methacrylate. Preferably the methacrylate or acrylate monomer is stearyl or lauryl methacrylate or acrylate. The hydrophobic portion of the polymer may be prepared from one or more of the hydrophobic monomers. Desirable carboxylated hydrophilic monomers are acrylic acid or methacrylic acid, or combinations thereof.

Typically, the weight average molecular weight of the polymeric dispersant has an upper limit such that it is less than 50,000 Daltons. Desirably the weight average molecular weight of the copolymer is less than 25,000 Daltons; more desirably it is less than 15,000 and most desirably less than 10,000 Daltons. The copolymer dispersants preferably have a weight average molecular weight lower limit of greater than 500 Daltons.

In one exemplary embodiment, the pigment particles are dispersed with a copolymer where the hydrophobic monomer is benzyl methacrylate and is present from 50 weight percent to 80 weight percent relative to the total weight of the polymeric dispersant and the hydrophilic monomer is methacrylic acid.

In a second embodiment, copolymer dispersants are employed which comprise a hydrophobic monomer having a carbon chain length of greater than or equal to 12 carbons present in an amount of at least 10% by weight of the total copolymer, and more desirably greater than 20% by weight, an optional additional hydrophobic monomer comprising an aromatic group and a hydrophilic monomer that is methacrylic acid. For example, the additional aromatic group containing monomer may be benzyl acrylate or benzyl methacrylate. An especially useful additional monomer is benzyl methacrylate.

The total amount of hydrophobic monomers, comprising the monomer having a chain with greater than or equal to 12 carbons and optionally, monomer containing an aromatic group, may be present in the polymer in an amount of 20 to 95% by weight of the total polymer. The hydrophobic aromatic-group containing monomer may be present in an amount from about 0 to 85% by weight of the total polymer, more typically from about 0 to 60%, and desirably from about 0 to 50%. A particularly useful embodiment of a polymeric dispersant for the pigment particles is a terpolymer of benzyl methacrylate, stearyl methacrylate and methacrylic acid. Particularly useful polymeric pigment dispersants are further described in US Patent Publication Numbers 2006/0012654 and 2007/0043144, the disclosures of which are incorporated by reference herein.

Encapsulating type polymeric dispersants and polymeric dispersed pigments thereof can also be used in the invention. Specific examples are described in U.S. Pat. Nos. 6,723,785, 6,852,777, and US Patent Publication Numbers 2004/0132942, 2005/0020731, 2005/0009951, 2005/0075416, 2005/0124726, 2004/0077749, and 2005/0124728. Encapsulating type polymeric dispersants can be especially useful because of their high dispersion stability on keeping and low degree of interaction with ink components. Composite colorant particles having a colorant phase and a polymer phase are also useful in aqueous pigment-based printing fluids of the invention. Composite colorant particles are formed by polymerizing monomers in the presence of pigments; see for example, US Patent Publication Numbers 2003/0199614, 2003/0203988, or 2004/0127639. Microencapsulated-type pigment particles are also useful and consist of pigment particles coated with a resin film; see for example U.S. Pat. No. 6,074,467.

The pigment particles useful in the invention may have any particle size that can be jetted through a printhead. Preferably, the pigment particles have a volume weighted mean particle size of less than about 0.5 micron. The pigment dispersions useful in pigment-based printing fluid compositions employed in the present invention desirably have a median particle diameter of less than 200 nm and more desirably less than 150 nm. In a particularly useful embodiment, 90 percent of the weight of the pigment particles in the distribution have a diameter less than 150 nm and desirably less than 100 nm.

Self-dispersing pigments, i.e., pigments that are dispersible without the use of a separate dispersant or surfactant, useful for the practice of the invention are those that have been subjected to a surface treatment such as oxidation/reduction, acid/base treatment, or functionalization through coupling chemistry. The surface treatment can render the surface of the pigment with anionic, cationic, or non-ionic groups. The preparation and use of covalently functionalized self-dispersed pigments suitable for inkjet printing are reported by Bergemann et al. in U.S. Pat. No. 6,758,891 and U.S. Pat. No. 6,660,075; Belmont in U.S. Pat. No. 5,554,739; Adams and Belmont in U.S. Pat. No. 5,707,432; Johnson and Belmont in U.S. Pat. No. 5,803,959 and U.S. Pat. No. 5,922,118; Johnson et al. in U.S. Pat. No. 5,837,045; Yu et al. in U.S. Pat. No. 6,494,943; in published applications WO 96/18695, WO 96/18696, WO 96/18689, WO 99/51690, WO 00/05313, and WO 01/51566; Osumi et al. in U.S. Pat. No. 6,280,513 and U.S. Pat. No. 6,506,239; Karl et al. in U.S. Pat. No. 6,503,311; Yeh, et al. in U.S. Pat. No. 6,852,156; Ito et al. in U.S. Pat. No. 6,488,753; and Momose et al. in EP 1,479,732. Examples of commercially available self-dispersing type pigments include CAB-O-JET 200, CAB-O-JET-250, CAB-O-JET-260, CAB-O-JET-270, and CAB-O-JET 300 (Cabot Specialty Chemicals, Inc.); BONJET CW-1, CW-2 and CW-3 (Orient Chemical Industries, Ltd.); and AQUA BLACK 162 and 001 (Tokai Carbon, Ltd.).

A wide variety of organic and inorganic pigments, alone or in combination with additional pigments or dyes, can be employed in the printing fluid in the present invention. Pigments that may be used in the invention include those disclosed in, for example, U.S. Pat. Nos. 5,026,427; 5,085,698; 5,141,556; 5,160,370; and 5,169,436. The exact choice of pigments will depend upon the specific application and performance requirements such as color reproduction and image stability. Dispersed pigment particles are typically present at from 1 to 10 wt % in the pigmented inkjet printing fluids employed in the invention, preferably 1 to 6 wt %. Pigments suitable for use in the invention include, but are not limited to, azo pigments, monoazo pigments, disazo pigments, azo pigment lakes, β-Naphthol pigments, Naphthol AS pigments, benzimidazolone pigments, disazo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black.

Typical examples of organic pigments that may be used include Color Index (C. I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, 194; C. I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 49:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264; C.I. Pigment Blue 1, 2, 9, 10, 14, 15:1, 15:2, 15:3, 15:4, 15:6, 15, 16, 18, 19, 24:1, 25, 56, 60, 61, 62, 63, 64, 66, bridged aluminum phthalocyanine pigments; C.I. Pigment Black 1, 7, 20, 31, 32; C. I. Pigment Orange 1, 2, 5, 6, 13, 15, 16, 17, 17:1, 19, 22, 24, 31, 34, 36, 38, 40, 43, 44, 46, 48, 49, 51, 59, 60, 61, 62, 64, 65, 66, 67, 68, 69; C.I. Pigment Green 1, 2, 4, 7, 8, 10, 36, 45; C.I. Pigment Violet 1, 2, 3, 5:1, 13, 19, 23, 25, 27, 29, 31, 32, 37, 39, 42, 44, 50; and C.I. Pigment Brown 1, 5, 22, 23, 25, 38, 41, 42.

In further embodiments, a printing fluid composition employed in the present invention may comprise a water soluble or water-dispersed polymer compound which is distinct from any dispersant used to disperse a pigment, and which is added, e.g., to improve physical durability of a printed image, or improve other characteristics of the printing fluid compositions, such as recirculation stability. Such a component may be, e.g., a water-dispersible polyurethane compound such as described, e.g., in U.S. Ser. No. 12/872,018, a water soluble block copolymer containing poly(ethylene oxide) segments such as described, e.g., in US20010123714, or a styrene-acrylic copolymer, having block or random segments comprised of styrene and acrylic monomers, where the average molecular weight of the additive is greater than 1000, such as described in US20110122180, the disclosures of which are incorporated by reference herein in their entireties. Such polymer additives may comprise, e.g., one or more polystyrene or substituted polystyrene chains copolymerized with other acrylate or substituted acrylate monomers or attached to another species. In one preferred embodiment, the polymer additive may comprise a copolymer of styrene, alpha-methylstyrene, acrylic acid and trisethylenoxyacrylate.

Printing fluid compositions for use in the invention, both pigment-based and clear, can comprise, e.g., water soluble or water-dispersed polymeric components at levels from 0.1 to 20% by weight based on the total printing fluid components. More desirable abrasion resistance can be imparted to the inkjet images when the printing fluid composition contains from 0.5 to 15% by weight of a water-dispersible polyurethane. For continuous inkjet printing systems, polyurethane concentrations of from 1% to 15%, more preferably 2 to 12%, and in one particular embodiment between 5% and 10%, based on the total printing fluid composition may be employed. These ranges provide improved durability of printed images, and improved recirculation stability for the printing fluid.

Printing fluid compositions employed in the invention may also comprise one or more low-volatile water soluble humectants, but the total weight % concentration of such humectants in the printing fluid is limited to being less than 10 wt % so as to reduce the effect thereof on printing fluid viscosity and excessive drying time. Representative examples of humectants which may be employed in the present invention include: (1) triols, such as; glycerol, 1,2,6-hexanetriol, 2-ethyl-2-hydroxymethyl-propane diol, trimethylolpropane, alkoxlated triols, alkoxylated pentaerythritols, saccharides, and sugar alcohols; and (2) diols, such as ethylene glycol, diethylene glycol, triethylene glycol, propylene glycol, polyalkylene glycols having four or more alkylene oxide groups, 1,3-propane dial, 1,2-butane diol, 1,3-butane diol, 1,4-butane diol, 1,2-pentane diol, 1,5-pentanediol, 1,2-hexanediol, 1,6-hexane diol, 2-methyl-2,4-pentanediol, 1,2-heptane diol, 1,7-hexane diol, 2-ethyl-1,3-hexane diol, 1,2-octane diol, 2,2,4-trimethyl-1,3-pentane diol, 1,8-octane diol; and thioglycol or a mixture thereof. Desirable humectants are polyhydric alcohols.

While higher levels may be typically preferred for use in drop-on-demand printers, the total humectant level of printing fluid compositions for CU printing in accordance with the present invention is less than 10% by weight, more preferably 8% or less by weight, and most preferably 6% or less by weight. A preferred range of humectant for CU printing fluids is from 0.5 to about 8% by weight, more preferably from 0.5 to about 6% by weight. The total humectant level of the ink is the sum of the individual sources of humectant ingredients, which may include humectant added directly during ink formulation, and for example humectant associated with a commercial biocide preparation as a supplemental ingredient, or with a commercial pigment dispersion preparation that may be present to prevent so-called "paint-flakes" of dried pigment cake forming around a bottle cap, as described in US Patent publication no. 2005/0075415 A1 to Harz et al. More desirably, the total humectant level is from about 1% to less than 10%, in order to facilitate drying of the inkjet printing recording material in a high speed printer while simultaneously encouraging higher equilibrium moisture content in dried ink film on hardware for redispersion and clean-up by ink, or by start-up and shut-down fluids, or by a printhead storage fluid.

The printing fluid compositions employed in the present invention may also include water miscible co-solvent or penetrants having higher volatility and lower boiling points than the low volatility humectant having a boiling point of greater than 170C. Representative examples of co-solvents used in the aqueous-based printing fluid compositions include: (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) lower mono- and di-alkyl ethers derived from the polyhydric alcohols; such as ethylene glycol monomethyl ether, ethylene glycol monobutyl ether, ethylene glycol monoethyl ether acetate, diethylene glycol monomethyl ether, and diethylene glycol monobutyl ether acetate; (3) nitrogen-containing compounds, such as urea, 2-pyrrolidinone, N-methyl-2-pyrrolidinone, imidazolidinone, and 1,3-dimethyl-2-imidazolidinone; and (4) sulfur-containing compounds, such as 2,2'-thiodiethanol, dimethyl sulfoxide, and tetramethylene sulfone. Typical aqueous-based printing fluid compositions useful in the invention may contain 1-15 weight percent co-solvent(s).

The pH of the aqueous printing fluid compositions employed in the invention may be adjusted by the addition of organic or inorganic acids or bases. Inorganic bases are preferred; however, small amounts of organic bases, such as triethanolamine, may be used to adjust the pH of the printing fluid. The pH of the inkjet ink composition directed at CIJ is desirably adjusted from about 7 to about 12; more desirably, the pH is about 8 to 10. When the ink composition is used in hardware with nickel or nickel-plated apparatus components, an anticorrosion inhibitor such as the sodium salt of 4- or 5-methyl-1-H-benzotriazole is desirably added and the pH adjusted to be from about 10 to about 11. When the ink composition is used with printheads with components fabricated from silicon that are in contact with the fluid, the ink composition pH is desirably adjusted to be from about 7 to about 9.5; more desirably, the pH ranges from about 7.5 to about 9. In order to reduce the risk of excessively protonating carboxylate anions associated with polymeric dispersants and anionic charge stabilized anti-abrasion polymers that might render the ink composition more susceptible to flocculation, pH levels lower than about 7 are desirably avoided. With hardware components fabricated from silicon in contact with the ink composition, pH levels higher than about 10 can induce significant rates of etch and corrosion that may impair the operation of the device over time. Typical inorganic acids include nitric, hydrochloric, phosphoric, and sulfuric acids. Typical organic acids include methanesulfonic, acetic, formic, and lactic acids. Typical inorganic bases include alkali metal hydroxides and carbonates. Typical organic bases include ammonia, triethanolamine, and tetramethylethylenediamine. Amine bases especially desirable in the application of the invention to CIJ printing include 3-amino-1-propanol, N,N-dimethanolamine, N,N-dimethylethanolamine, N,N-diethylethanolamine, and triethanolamine. The well known Goods buffers can also be employed.

Surfactants may be added to adjust the surface tension of the printing fluid to an appropriate level. The surfactants may be anionic, cationic, amphoteric, or nonionic and used at levels of 0.01 to 5% of the ink composition. Examples of suitable nonionic surfactants include, linear or secondary alcohol ethoxylates (such as the TERGITOL 15-S and TERGITOL TMN series available from Union Carbide and the BRIJ series from Uniquema), ethoxylated alkyl phenols (such as the TRITON series from Union Carbide), fluoro surfactants (such as the ZONYLS from DuPont; and the FLURADS from 3M), fatty acid ethoxylates, fatty amide ethoxylates, ethoxylated and propoxylated block copolymers (such as the PLURONIC and TETRONIC series from BASF, ethoxylated and propoxylated silicone based surfactants (such as the SILWET series from CK Witco), alkyl polyglycosides (such as the GLUCOPONS from Cognis), and acetylenic polyethylene oxide surfactants (such as the SURFYNOLS from Air Products, Inc.).

Examples of anionic surfactants include carboxylated (such as ether carboxylates and sulfosuccinates), sulfated (such as sodium dodecyl sulfate), sulfonated (such as dodecyl benzene sulfonate, alpha olefin sulfonates, alkyl diphenyl oxide disulfonates, fatty acid taurates, and alkyl naphthalene sulfonates), phosphated (such as phosphated esters of alkyl and aryl alcohols, including the STRODEX series from Dexter Chemical), phosphonated and amine oxide surfactants, and anionic fluorinated surfactants. Examples of amphoteric surfactants include betaines, sultaines, and aminopropionates. Examples of cationic surfactants include quaternary ammonium compounds, cationic amine oxides, ethoxylated fatty amines, and imidazoline surfactants. Additional examples of the above surfactants are described in "McCutcheon's Emulsifiers and Detergents," 1995, North American Edition.

A biocide (0.01-1.0% by weight) may also be added to prevent unwanted microbial growth which may occur in the printing fluid over time. A preferred biocide for the printing fluids employed in the present invention is PROXEL GXL (Zeneca Colours Co.) at a concentration of 0.05-0.1% by weight or/and KORDEK (Rohm and Haas Co.) at a concentration of 0.05-0.1% by weight (based on 100% active ingredient).

Additional additives which may optionally be present in an inkjet printing fluid composition include thickeners, conductivity enhancing agents, anti-kogation agents, drying agents, waterfast agents, dye solubilizers, chelating agents, binders, light stabilizers, viscosifiers, buffering agents, anti-mold agents, anti-curl agents, stabilizers, and defoamers. Defoaming agents comprised of phosphate esters, polysiloxanes, or acetylenic diols, e.g., may further optionally be used with the ink compositions directed at CIJ to reduce foam formation caused by the fluid agitation associated with drop catching and ink recirculation.

The exact choice of ink components will depend upon the specific application and performance requirements of the printhead from which they are to be jetted. Desirable viscosities are no greater than 10 cP, preferably in the range of 1.0 to 5.0 cP.

In the continuous inkjet printing method of the invention, a main fluid supply of a continuous inkjet printer is provided with a printing fluid as described above, and the printing fluid is delivered from the main fluid supply to a printhead and ejected as a continuous stream from the printhead, which continuous stream is broken into spaced droplets. In response to electrical signals received from a control mechanism, the spaced droplets are controlled to select between printing droplets for marking a substrate and nonprinting droplets that are collected and returned to the main fluid supply. Upon completion of a printing procedure, delivery of the printing fluid to the printhead is stopped, and a maintenance fluid is delivered from a maintenance fluid supply to the printhead and ejected from the printhead to purge the printing fluid from the printhead. The maintenance fluid may then be stored in the printhead for a period of time, and delivery of the printing fluid from the main fluid supply to the printhead subsequently restarted to start a new printing procedure.

In accordance with the invention, the maintenance fluid comprises water and at least 5 wt % low-volatile water soluble humectant having a boiling point of greater than 170C, and the concentration of low-volatile water soluble humectant in the maintenance fluid is greater than that in the printing fluid. Preferably, humectant is employed in the maintenance fluid at from 5-30 wt %, more preferably 8 to 20 wt %, and most preferably 10 to 20 wt %. By employing a maintenance fluid having a higher humectant content than that of the printing fluid, printing fluid residue may be more effectively prevented from forming on the printheads during storage during shutdown, and more easily redispersed upon subsequent startup, while the advantages of printing with a printing fluid having relatively low humectant level (e.g., low viscosity of the printing fluid and faster drying of a printed image) may also be retained.

In one embodiment of the invention, the printing fluid preferably comprises less than or equal to 6 wt % of low-volatile humectant, and the maintenance fluid comprises greater than 8 wt % of low-volatile humectant. In a further embodiment, the maintenance fluid preferably comprises at least 10 wt % of low-volatile humectant. In yet a further embodiment, the ratio of wt % of low-volatile humectant in the maintenance fluid to wt % low-volatile humectant in the printing fluid is at least 3:2. Such embodiments further enhance the beneficial relative effects of use of humectants in the printing fluid and maintenance fluid employed in accordance with the invention.

The humectant employed in the maintenance fluid may comprise any of the humectants such as described for use in the printing fluid. In a preferred embodiment, the humectant employed has a boiling point of at least 200C, more preferably at least 250C. In particularly preferred embodiments, the low-volatile humectant in the maintenance fluid comprises triethylene glycol, and the maintenance fluid has a ph of from 8.0 to 9.0, as such a maintenance fluid has been found to be compatible with each of the printing fluids employed in the commercial KODAK PROSPER continuous inkjet printing systems.

In addition to water and the low-volatile humectant, the maintenance fluid may further comprise various other components as may be typically employed in printing fluids employed in inkjet printers, such as dispersants (typically 0.1-5.0 wt %, e.g., ZETASPERSE 1600 from Air Products and Chemicals), solvents (typically 2-20 wt %, e.g., an alcohol, an ether (for example, diethylene glycol monobutyl ether), a ketone or an ester), biocides (typically e.g., PROXEL GXL from Arch Chemicals), corrosion inhibitors (typically 0.1-1.0 wt %, e.g., COBRATEC TT50S from PMC Specialties) and pH buffer components (e.g., acetic acid at from 0.5-2.0 wt % and alkanolamine or ammonia at from 0.2-2.0 wt %).

The following examples illustrate, but do not necessarily limit, the utility of the preset invention.

Samples of maintenance fluids were formulated as follows: Each test fluid comprised water, a dispersant (ZETASPERSE 1600, Air Products and Chemicals) at 1.0 wt %, diethylene glycol monobutyl ether (Dow) at 5.0 wt %, biocide (PROXEL GXL, Arch Chemicals) at 0.1 wt %, corrosion inhibitor (COBRATEC TT50S, PMC Specialities) at 0.1 wt %, pH buffer components comprising acetic acid and an ethanolamine, and low-volatile humectants as shown in Table 1.

TABLE 1

Maintenance fluid formulas

| Formula | Base | Acetic acid | Humectant (10%) | pH |
|---|---|---|---|---|
| 1.1 | None | 0.001% | None | 8.20 |
| 1.2 | DMEA* 0.6% | 1.10% | Glycerin | 8.90 |
| 1.3 | DMEA 0.6% | 1.10% | Propylene glycol | 9.15 |
| 1.4 | DMEA 0.6% | 1.10% | Diethylene glycol | 9.15 |
| 1.5 | DMEA 0.6% | 1.10% | Triethylene glycol | 9.15 |
| 1.6 | TEA* 0.07% | 0.80% | Triethylene glycol | 8.50 |
| 1.7 | TEA 0.72% | 0.095% | Triethylene glycol | 8.75 |

*DMEA = Dimethylethanolamine; TEA = Triethanolamine

Ink Compatibility Test

To a 20 g sample of a maintenance fluid is added 2.0 g of an ink. The resulting mixture is dried for 16 hours at atmospheric pressure at 50 C. After 16 hours, the residue is examined for flocculation of the pigment by unaided visual inspection and by optical microscopy at 100× magnification. A ranking of "A" is given where no flocculation is observed. A rank of "B" is given if flocculation is visible only with magnification for at least one ink tested. A ranking of "C" is given if flocculation is visible to the unaided eye for at least one ink tested.

Four humectants were evaluated for compatibility with KODAK PROSPER cyan, magenta, yellow and black inks, each of which comprise polymer dispersed pigments with humectant concentrations of less than or equal to 6 wt %. The boiling points were obtained from the handbook of Chemistry and Physics (1974). The results are shown in Table 2.

TABLE 2

Compatibility of maintenance fluids with pigment-based inks

| Formula | Humectant | Ink Compatibility | Boiling Point (C.) |
|---|---|---|---|
| 1.2 | Glycerin | C | 290 |
| 1.3 | Propylene glycol | B | 189 |
| 1.4 | Diethylene glycol | A | 245 |
| 1.5 | Triethylene glycol | A | 278 |

Printhead Test Procedure

Four KODAK PROSPER printheads were used to print PROSPER cyan, yellow, magenta, and black inks, respectively, each of which comprise polymer dispersed pigments with humectant concentrations of less than or equal to 6 wt %, and then were shut down using the standard shutdown/purge process in which maintenance fluid is supplied to and ejected from the printhead to purge the printing fluid from the printhead. The printheads were then placed in a 50 C oven for 16 hours and restarted using a standard start up procedure. The startups were rated based on the number of crooked or ragged jets observed in a test print. Zero crooked or ragged jets are considered a "pass". One or more crooked or ragged jets are a "fail". Procedural details follow.

a. Install a jetting module (JM) in a continuous inkjet writing system with the ink and cleaner fluid to be tested.
   b. Bring the JM to a "Print Ready" condition and generate acceptable prints with image quality (no streakers, crooked or ragged jets).
   c. Shutdown the JM system using the "Shutdown Purge" process.
   d. Remove the JM and place in a storage case
   e. Place the case containing the JM in an oven that is pre-heated to 50 C.
   f. Leave the JM in the oven for 16 hrs, maintaining an oven temperature of 50 C.
   g. Remove the JM from the oven and re-install it in the writing system
   h. Bring the JM to "Print Ready" and evaluate image quality.
   i. The JM passes the test if no "wipe" is required to recover JM and remove any crooked or ragged jets or streakers. A JM fails if any print defect occurs.

The results of startup tests for five different KODAK PROSPER inks with the maintenance fluid samples are shown in Table 3.

TABLE 3

Results of jetting module start up tests

| Fluid | K8002 Black Ink | C9001 Cyan Ink | C10002 Cyan Ink | M8006 Magenta Ink | Y9003 Yellow Ink |
|---|---|---|---|---|---|
| 1.1 | F | P | n/a | F | P |
| 1.2 | P | P | P | P | F |
| 1.5 | P | P | P | P | F |
| 1.6 | P | n/a | P | n/a | P |
| 1.7 | n/a | n/a | n/a | n/a | P |

Comparative fluid 1.1, including no high-boiling point humectants, failed to provide good startup for black and yellow inks. Fluid 1.2, comprising high boiling point glycerin provided good startups for black, cyan and magenta inks, but failed with yellow ink. This result is predicted by the compatibility test that showed flocculation of yellow ink when combined with fluid 1.2. Fluid 1.5, comprising high boiling point triethylene glycol provided similar results as fluid 1.2 with the inks. Fluids 1.2 and 1.5 may be advantageously used individually with such black, cyan, and magenta inks, e.g. for monochrome printing operations. Fluids 1.6 and 1.7, in accordance with a preferred embodiment of the invention, both provided passing startups with all inks tested, including the yellow ink, and thus may be employed with all inks of a CYMK ink set. These fluids are distinguished by lower pH, 8.50 and 8.75, respectively, than the pH of 9.15 for fluid 1.5.

The invention claimed is:

1. A method of continuous inkjet printing comprising:
   A) providing a main fluid supply of a continuous inkjet printer with a printing fluid comprising water, a soluble or dispersed polymeric component, and less than a total of 10 wt % of low-volatile water soluble humectant having a boiling point of greater than 170C;
   B) delivering the printing fluid from the main fluid supply to a printhead and ejecting a continuous stream of the printing fluid from the printhead which continuous stream is broken into spaced droplets;
   C) in response to electrical signals received from a control mechanism, controlling the spaced droplets to select between printing droplets for marking a substrate and nonprinting droplets that are collected and returned to the main fluid supply;
   D) stopping delivery of the printing fluid to the printhead upon completion of a printing procedure;
   E) providing a maintenance fluid supply with a maintenance fluid comprising water and at least 5 wt % low-volatile water soluble humectant having a boiling point of greater than 170C, wherein the concentration of low-volatile water soluble humectant in the maintenance fluid is greater than that in the printing fluid; and
   F) delivering the maintenance fluid from the maintenance fluid supply to the printhead after use of the printing fluid in the printhead and ejecting the maintenance fluid from the printhead to purge the printing fluid from the printhead.

2. The method of claim 1, further comprising storing the maintenance fluid in the printhead for a period of time, and subsequently restarting delivery of the printing fluid from the main fluid supply to the printhead to start a new printing procedure.

3. The method of claim 1, wherein the printing fluid comprises dispersed pigment particles.

4. The method of claim 3, wherein the pigment particles are dispersed with a polymeric dispersant, are dispersed with a surfactant, or are self dispersed without the need for a separate dispersant.

5. The method of claim 3, wherein the pigment particles are dispersed with a polymeric dispersant, and the water soluble or dispersed polymeric component comprises the polymeric dispersant.

6. The method of claim 3, wherein the pigment particles are present in the printing fluid at a weight concentration of from 1 to 10 wt %.

7. The method of claim 1, wherein the water soluble or dispersed polymeric component comprises a polyurethane or an acrylic copolymer.

8. The method of claim 1, wherein the printing fluid comprises less than or equal to 6 wt % of low-volatile humectant, and the maintenance fluid comprises greater than 8 wt % of low-volatile humectant.

9. The method of claim 1, wherein the maintenance fluid comprises at least 10 wt % of low-volatile humectant.

10. The method of claim 1, wherein the ratio of wt % of low-volatile humectant in the maintenance fluid to wt % low-volatile humectant in the printing fluid is at least 3:2.

11. The method of claim 1, wherein the low-volatile humectant in the maintenance fluid has a boiling point of at least 200C.

12. The method of claim 1, wherein the low-volatile humectant in the maintenance fluid has a boiling point of at least 250C.

13. The method of claim 1, wherein the low-volatile humectant in the maintenance fluid comprises triethylene glycol.

14. The method of claim 13, wherein the maintenance fluid has a pH of from 8.0 to 9.0.

15. The method of claim 1, wherein the maintenance fluid has a pH of from 8.0 to 9.0.

* * * * *